United States Patent
Marinier et al.

(10) Patent No.: US 7,079,494 B2
(45) Date of Patent: Jul. 18, 2006

(54) WIRELESS COMMUNICATION METHOD AND APPARATUS FOR DETERMINING THE MINIMUM POWER LEVEL OF ACCESS POINT TRANSMISSIONS

(75) Inventors: Paul Marinier, Brossard (CA); Angelo Cuffaro, Laval (CA); Christopher Cave, Candiac (CA); Vincent Roy, Montreal (CA)

(73) Assignee: InterDigital Technology Corporation, Wilmington, DE (US)

( * ) Notice: Subject to any disclaimer, the term of this patent is extended or adjusted under 35 U.S.C. 154(b) by 27 days.

(21) Appl. No.: 10/926,892

(22) Filed: Aug. 26, 2004

(65) Prior Publication Data

US 2005/0153690 A1    Jul. 14, 2005

Related U.S. Application Data

(60) Provisional application No. 60/535,043, filed on Jan. 8, 2004.

(51) Int. Cl.
*H04J 1/16* (2006.01)

(52) U.S. Cl. ............ 370/252; 370/329; 370/278

(58) Field of Classification Search ........... 370/328, 370/329, 278, 339, 252; 455/522, 73, 278.1, 455/456, 455; 379/58
See application file for complete search history.

(56) References Cited

U.S. PATENT DOCUMENTS

| | | | |
|---|---|---|---|
| 6,463,290 B1 | 10/2002 | Stilp et al. | 455/456 |
| 2002/0090966 A1* | 7/2002 | Hansen et al. | 455/522 |
| 2002/0131376 A1 | 9/2002 | Wheatley, III et al. | 370/328 |
| 2002/0168993 A1* | 11/2002 | Choi et al. | 455/522 |
| 2006/0040698 A1* | 2/2006 | Shiu et al. | 455/522 |

* cited by examiner

*Primary Examiner*—John Pezzlo
(74) *Attorney, Agent, or Firm*—Volpe and Koenig, P.C.

(57) ABSTRACT

A method and apparatus which determine the minimum transmission power level of an access point (AP) for reliably communicating with at least one wireless transmit/receive unit (WTRU) in a wireless communication system. The apparatus obtains the range of the AP and estimates the interference to the AP by executing a slow interference estimation process and a fast interference estimation process. A required received power (RRP) of the WTRU is obtained from the interference estimate. The minimum transmission power level of the AP is determined by summing the range of the AP and the RRP.

16 Claims, 2 Drawing Sheets

WIRELESS COMMUNICATION METHOD AND APPARATUS FOR DETERMINING THE MINIMUM POWER LEVEL OF ACCESS POINT TRANSMISSIONS

CROSS REFERENCE TO RELATED APPLICATION

This application claims priority from U.S. Provisional Application No. 60/535,043, filed Jan. 8, 2004, which is incorporated by reference as if fully set forth herein.

FIELD OF INVENTION

The present invention relates to power control in shared wireless networks. More particularly, the present invention relates to a method and apparatus which determine the minimum transmission power level of an access point (AP) to compensate for prevailing interference conditions between the AP and at least one wireless transmit/receive unit (WTRU).

BACKGROUND

Wireless local area networks (WLANs) have become more popular because of their convenience and flexibility. Such networks typically include an AP and a plurality of WTRUs which wirelessly communicate with one another. When transmitting information in a WLAN, it is found that interference is produced in other nearby networks using the same frequency band.

As new applications for such networks are being developed, their popularity is expected to significantly increase. Institute of Electrical and Electronics Engineers (IEEE) working groups have defined an IEEE 802.11 baseline standard having extensions which are intended to provide higher data rates and other network capabilities.

In accordance with the IEEE 802.11 baseline standard, WLANs use a carrier-sense multiple access/collision avoidance (CSMA/CA) medium access scheme in which the WTRU's transmissions are not distinguished from each other by means of different modulation codes. Rather, each WTRU, (and AP), transmits packets containing the sender and destination addresses in their headers. In order to avoid reception errors, the WTRUs attempt to avoid transmitting simultaneously by sensing the wireless medium prior to transmitting.

The goal of the power control process is to determine the transmission power of an AP to the most appropriate value. The power control process must adequately serve associated WTRUs that are within a certain region (coverage area) around the AP, taking into account possible interference experienced by these WTRUs. This may be accomplished by determining the minimum power level at which the AP transmission power. Furthermore, the power control process must minimize the interference to WTRUs and APs in neighboring Base Service Sets (BSSs) which results in an excessive number of lost packets and/or deferrals in these BSSs. This may be accomplished by selecting a power level between the minimum power level and a maximum power level.

A method and system for reliably and accurately determining the minimum power level of AP transmissions is desired.

SUMMARY

The present invention is a wireless communication method and apparatus for determining the minimum transmission power level of an AP for reliably communicating with at least one WTRU in a wireless communication system. The apparatus may be a wireless communication system, an AP or an integrated circuit (IC). The apparatus obtains the range of the AP and estimates the interference to the AP by executing a slow interference estimation process and a fast interference estimation process. A required received power (RRP) of the WTRU is obtained from the interference estimate. The minimum transmission power level of the AP is determined by summing the range of the AP and the RRP.

BRIEF DESCRIPTION OF THE DRAWING(S)

A more detailed understanding of the invention may be had from the following description, given by way of example and to be understood in conjunction with the accompanying drawings wherein.

DETAILED DESCRIPTION OF THE PREFERRED EMBODIMENT(S)

Figure 1:
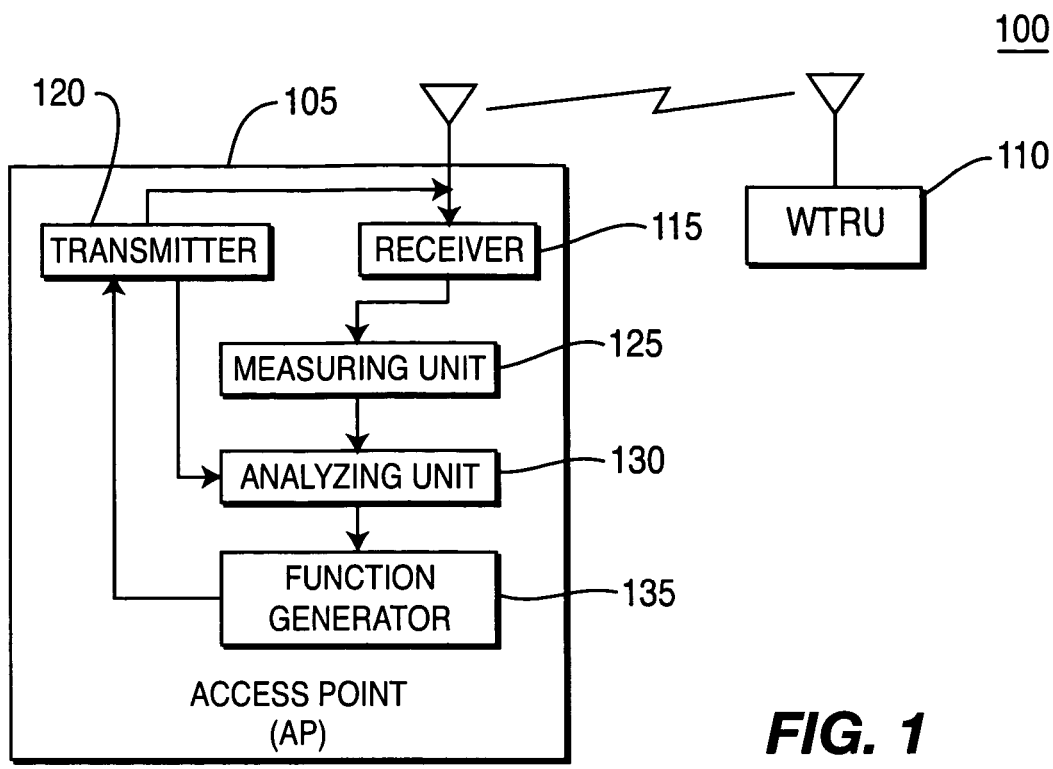
FIG. 1 is a block diagram of a wireless communication system in accordance with the present invention.

Hereafter, the terminology "WTRU" includes but is not limited to a user equipment (UE), mobile station, fixed or mobile subscriber unit, pager, or any other type of device capable of operating in a wireless environment.

When referred to hereafter, the terminology "AP" includes but is not limited to a base station, a Node-B, site controller or any other type of interfacing device in a wireless environment. The invention is particularly applicable to wireless local area networks (WLAN).

The present invention will be described with reference to the drawing figures wherein like numerals represent like elements throughout. The present invention applies as an add-on to the WLAN IEEE 802.11 standards (802.11 baseline, 802.11a, 802.11b, and 802.11g), and also applies to IEEE 802.11e, 802.11h and 802.16.

The present invention may be further applicable to Time Division Duplex (TDD), Frequency Division Duplex (FDD), and Time Division Synchronous CDMA (TD-SCDMA), as applied to a Universal Mobile Telecommunications System (UMTS), CDMA 2000 and CDMA in general, but is envisaged to be applicable to other wireless systems as well.

The features of the present invention may be incorporated into an integrated circuit (IC) or be configured in a circuit comprising a multitude of interconnecting components.

This present invention computes a minimum transmission power level for an AP for providing a desired coverage area and to provide satisfactory performance of downlink transmissions from the AP to the WTRU.

The desired coverage area is defined in terms of a maximum path loss (hereinafter referred to as the "range of the AP") between the AP and a WTRU associated to this AP, such that the WTRU enjoys satisfactory performance. The range may be automatically computed based on measurements of path loss to other neighboring APs, or be specified manually as a configuration parameter.

The satisfactory performance of downlink transmissions from the AP to the WTRU is provided by computing a minimum RRP based on statistics of packet errors in the downlink direction in the AP's own BSS, as well as the level of interference directly perceived by the AP. The minimum transmission power level (in dBm) is then obtained by summing the range of the AP (in dB) with the RRP (in dBm).

FIG. 1 is a block diagram of a wireless communication system 100 according to the present invention. The system 100 includes an AP 105 and at least one WTRU 110. The AP 105 includes a receiver 115, a transmitter 120, a measuring unit 125, an analyzing unit 130, and a function generator 135. The measuring unit 125 measures the interference at the AP 105 based on data received via receiver 115. The analyzing unit 130 analyzes measurement data provided by the measuring unit 125. Furthermore, the analyzing unit 130 receives and uses information on data packets transmitted by the transmitter 120 to the WTRU 110. The function generator 125 provides RRP and minimum transmission power parameters to the transmitter 120 as determined by the analyzing unit 130. The parameters are then transmitted from the AP 105 to the WTRU 110.

Figure 2:
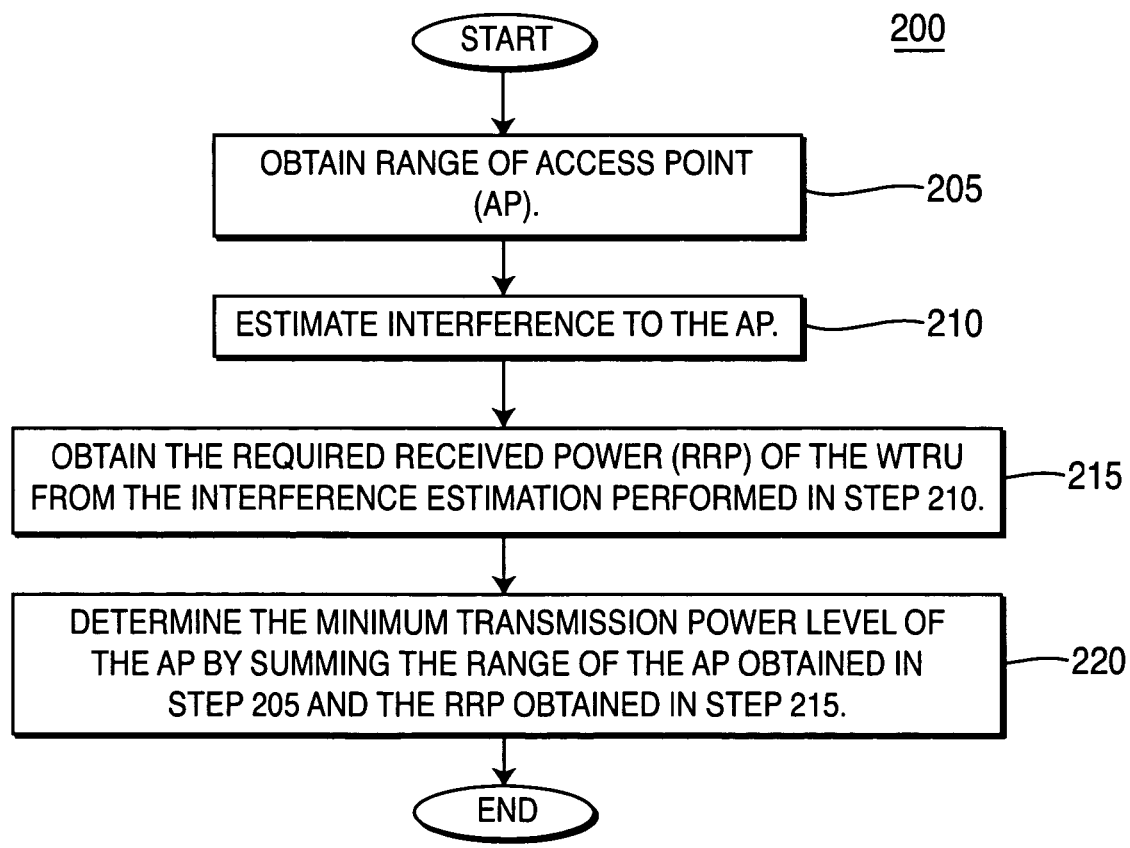
FIG. 2 is a flowchart of a power control process for determining the minimum transmission power of an AP in the system of FIG. 1.

FIG. 2 is a flowchart of a power control process 200 including method steps which are executed in system 100. In step 205, the range of the AP 105 is determined. In step 210, an estimate of the interference to the AP 105 is performed by the analyzing unit 130. In step 215, the RRP of the WTRU 110 is obtained from the interference estimate of step 210. As a result, the minimum transmission power level of the AP 105 is obtained by summing the range of the AP 105 and the RRP of the WTRU 110 (step 220).

Table 1 illustrates exemplary parameters involved in the determination of the AP transmission power. Other parameters and values may be used, in addition to, or in place of these parameters and values.

TABLE 1

| Symbol | Description | Value |
|---|---|---|
| RNG | Range of the AP | Manually configured or calculated using other processes |
| RRP | Required Received Power | Calculated by the AP |
| $P_{max}$ | Maximum AP transmission power | |
| $P_{min}$ | Minimum AP Transmission power | P = min ($P_{max}$, RNG + RRP) |

Control of the RRP based on the estimation of interference according to the present invention will now be described with reference to FIGS. 3 and 4. Adjustment of the optimal RRP is implemented by executing a slow interference estimation process and a fast interference estimation process. Each of these processes use different measurements to evaluate the most appropriate value of the RRP at a given time.

The role of the slow interference estimation is to obtain the RRP with a reasonable degree of accuracy. The slow interference estimation produces a value designated RRP from downlink statistics ($RRP_{DS}$) obtained from the transmission of packets to the WTRUs 110 during normal operation. The slow interference estimation is performed with a period, $T_{DS}$, which is relatively long, (e.g., approximately 1 minute).

The slow interference process is not executed every time a packet is transmitted by the WTRU 110, in the sense that a new value of the RRP would be computed. Rather, statistics are collected over the multiple packets transmission that take place in between the activations (i.e., over $T_{DS}$). Upon execution of the slow interference estimation, the statistics are processed and the value of RRP is updated on a periodic basis (i.e., it is not triggered by a specific event). However, there could be a random component (jitter) between executions of the slow interference process.

The role of the fast interference estimation is to ensure that the AP 105 can rapidly determine the transmission power to enable fast compensation of external interference, and allow at least some packets to be transmitted successfully after a sudden increase of interference. The fast interference estimation process produces a value designated RRP from Uplink Interference ($RRP_{UI}$). This value is obtained by measuring external interference at the AP 105 obtained by measurement of a received signal strength indicator (RSSI) associated with one or more WTRU transmitted packets in the absence of carrier lock. The fast interference estimation runs with a period ($T_{UI}$), which is relatively short, for example, on the order of a second. The RRP is obtained by summing $RRP_{DS}$ and $RRP_{UI}$ at any desired time.

Figure 3:
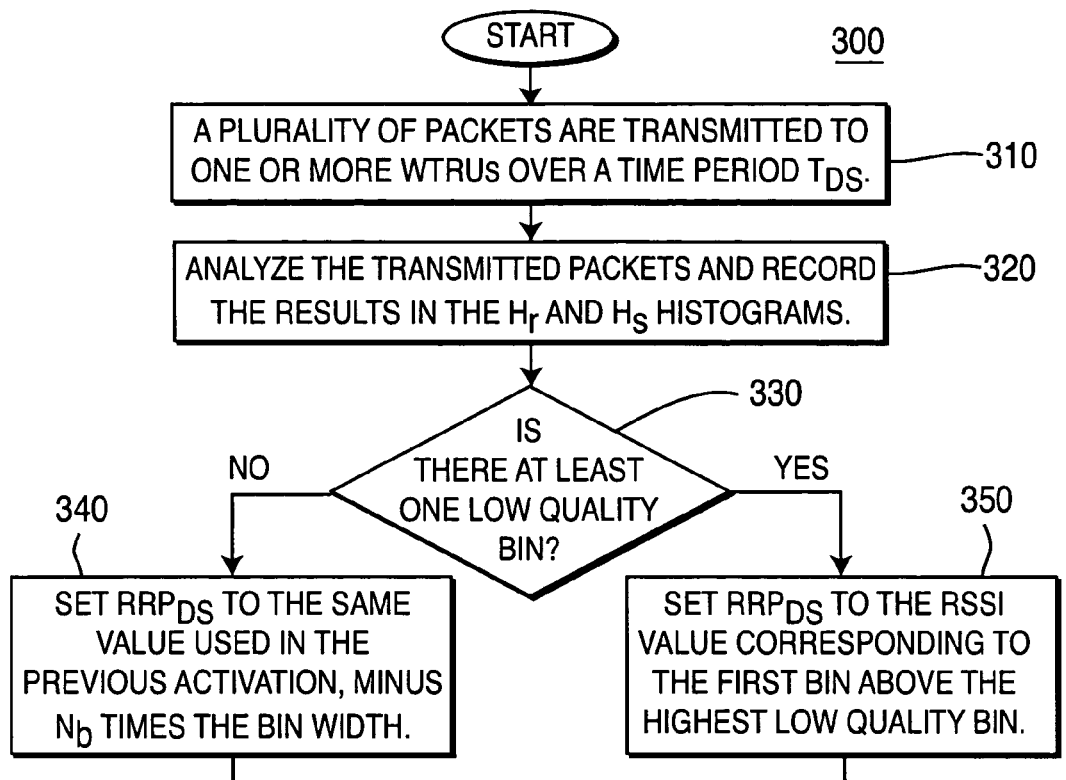
FIG. 3 is a flowchart of a slow interference estimation process used by the power control process in accordance with the present invention.

FIG. 3 is a flowchart showing the method steps of a slow interference estimation process 300 in accordance with the present invention. The slow interference process 300 is activated on a periodic basis. During a particular period $T_{DS}$, a plurality of packets are transmitted to one or more WTRUs 110 and statistics of the packets are collected (step 310). The analyzing unit 130 in the AP 105 analyzes the transmitted packets and records the result of the analysis in two separate histograms (step 320). The two histograms have the RSSI perceived by the WTRU 110 as the category axis. Bins of approximately 1 or 2 dB, preferably, may be used.

A first histogram $H^r$ records the average data rate of successfully transmitted packets and a second histogram $H_s$ is the percentage of successfully transmitted packets. The histogram $H_r$ is used only if rate control is enabled. Thus, the AP 105 may use different data rates for different WTRUs 110, according to the signal-to-noise ratio (SNR) perceived by the WTRU 110. The AP 105 would use a higher bit rate for WTRUs 110 enjoying a high SNR and a lower bit rate for WTRUs 110 with lower SNRs by performing a rate control process. Such a process may be based on downlink performance statistics for individual WTRUs 110.

Every time a packet is transmitted to the WTRU 110, a success or a failure event is recorded in the $H_s$ histogram according to whether or not the packet is received successfully. In the event that the packet is received successfully, it is recorded as a success event in the $H_s$ histogram. If the packet is not received successfully, it is recorded as a failure in the $H_s$ histogram. The data rate of the packet sent from the AP 105 is also recorded in the $H_r$ histogram.

The RSSI of the latest successfully received packet from the WTRU 110 is used to determine which bin of the histogram is utilized. The RSSI measured at the AP 105 is translated to an RSSI perceived by the WTRU 110. This translation is obtained by adding to the RSSI at the AP 105 the difference between the transmission power of the AP 105 and the assumed transmission power of the WTRU 110, which can be described as follows:

$$RSSI(WTRU)\text{perceived} = TxPower(AP) - TxPower(WTRU) + RSSI(AP) \quad \text{Equation 1}$$

Equation 1 is determined based on the following two equations:

$$RSSI(AP) = TxPower(WTRU) - PathLoss(WTRU-AP) \quad \text{Equation 2}$$

$$RSSI(WTRU) = TxPower(AP) - PathLoss(WTRU-AP) \quad \text{Equation 3}$$

where TxPower (WTRU) is the transmission power of the WTRU 110, TxPower (AP) is the transmission power of the AP 105, and PathLoss (WTRU–AP) is the path loss between the WTRU 110 and the AP 105. An age limit ($A_{maxRSSI}$) may be imposed on the latest RSSI measurement, to avoid biasing the statistics when a WTRU 110 wanders away from the AP 105.

Table 2 shows an exemplary result that could be observed as a result of the computation of the average data rate $H_r$ as well as the percentage of successful transmissions $H_s$ for each RSSI bin. The $H_r$ and $H_s$ histograms will not be perfectly monotonous in practice because of the different levels of interference experienced by the WTRUs 110.

TABLE 2

| RSSI (dBm) | Number of packets | $H_r$ Average data rate (Mbps) | $H_s$ Percentage of successes (%) |
|---|---|---|---|
| −93 | 243 | 1.0 | 20 |
| −92 | 17 | 1.2 | 23 |
| −91 | 204 | 1.7 | 20 |
| −90 | 100 | 1.5 | 18 |
| −89 | 87 | 2.1 | 25 |
| −88 | 127 | 1.9 | 23 |
| −87 | 83 | 2.7 | 35 |
| −86 | 462 | 4.4 | 50 |
| −85 | 303 | 4.2 | 51 |
| −84 | 298 | 5.1 | 59 |
| −83 | 74 | 5.3 | 62 |
| −82 | 193 | 5.8 | 64 |
| −81 | 382 | 7.0 | 68 |
| −80 | 584 | 7.4 | 70 |

Table 2 is a good example of a histogram. A bin corresponds to a row in Table 2. The RSSI column in Table 2 shows the value corresponding to the center of the bin. For example, the row where RSSI=−89 dBm provides the bin collecting statistics of packets for which RSSI values range from −89.5 dBm to −88.5 dBm.

A new histogram is built based on the packets transmitted over a period of duration $T_{DS}$. Instead of computing the $RRP_{DS}$ based on this last histogram only, it is preferable to combine the data from this last histogram to the data from past ($N_{hav}-1$) histograms in order to get better statistical significance and smoother behavior. First, the "number of packets" from all histograms are summed to get a total number of packets. Then, the data rates of packets from all histograms are summed, and the result is divided by the total number of packets from all histograms to get the average data rate ($H_r$). Finally, the number of packets successfully transmitted from all histograms are summed, and the result is divided by the total number of transmitted packets from all histograms to get the percentage of success ($H_s$).

Referring still to FIG. 3, after the transmitted data is analyzed the results are recorded in the histograms in step 320, it is determined whether there is at least one low quality bin (step 330). It is preferable to determine the above criteria according to the following definitions of "a significant bin" and "a low quality bin". The significant bin is an RSSI bin for which a minimum amount of packets ($N_{DSmin}$) were received. The low quality bin is a significant bin satisfying one of the following conditions: average data rate of successful transmissions is below a threshold ($R_{min}$) and rate control is enabled; or the percentage of successful transmissions is below a threshold ($S_{min}$) (i.e., the percentage of non-successful transmissions is above a threshold $F_{min}$). The value of $RRP_{DS}$ is then calculated according to whether or not there is at least one low quality bin, as determined in step 330. In the example set forth in Table 2, $RRP_{DS}$ would be set to −84 dBm if the $R_{min}$ and the $S_{min}$ were set to 5 Mbps and 50% respectively.

If in step 330 it is determined that there is no low quality bin, $RRP_{DS}$ is set to the same value that was used in a previous activation, minus $N_b$ times the bin width (step 340). $N_b$ is a parameter and may be set to 1 by default. However, it is preferable that the $RRP_{DS}$ does not fall below the minimum value $RSSI_{min}$ used in the histograms. In case there was no previous activation, it is set to a minimum value, $RRP_{min}$. This value is configurable parameter.

If in step 330 it is determined that there is at least one low quality bin, $RRP_{DS}$ is set to the RSSI value corresponding to the first bin above the highest low quality bin (step 350).

The slow interference estimation process 300 set forth in FIG. 3 produces a relatively accurate result during low activity periods when little data is transmitted. For example, if there is a single associated WTRU 110 located in the vicinity of the AP 105 and experiencing good quality, $RRP_{DS}$ will not be raised to the power received by this WTRU 110. However, one potential problem with this slow interference estimation process 300 is the variability of the transmission power amongst WTRUs 110; particularly those from different manufacturers. Since the AP 105 cannot access the setting of transmission power of a particular WTRU 110, a value must be assumed that would be used for all WTRUs 110. If a WTRU 110 transmits at a power lower than the assumed value, its RSSI will be underestimated. As a result, the quality of service for this RSSI could be overestimated, which will tend to reduce the RRP and the AP transmission power level.

In the opposite case, if a WTRU 110 transmits at a power higher than the assumed value, its RSSI will be overestimated and the end result is that the AP 105 transmission power will be increased. This problem would be eliminated if it were possible to read or control the maximum power of a WTRU 110.

A prerequisite for the slow interference estimation process 300 is that a reasonable number of downlink transmissions are successful. This condition may not be met when the interference conditions in the BSS deteriorate rapidly and/or dramatically due to the appearance of an external interference source.

Figure 4:
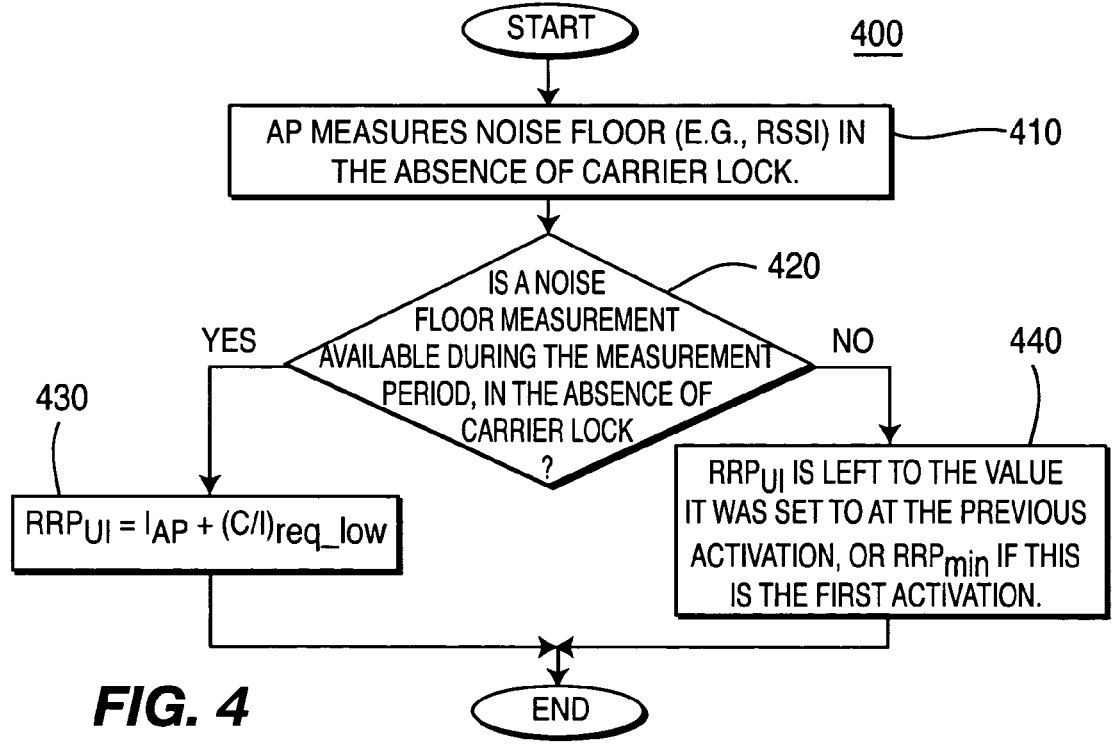
FIG. 4 is a flowchart of a fast interference estimation process used by the power control process in accordance with the present invention.

FIG. 4 is a is a flowchart showing the method steps of a fast interference estimation process 400 in accordance with the present invention. In step 410, the measuring unit 125 in the AP 105 measures a noise plus interference floor, (hereinafter called "noise floor" for simplicity). This noise floor consists of a combination of external interference and of weak signals that cannot be decoded. The noise floor can be measured as the RSSI when there is no carrier lock, that is, when the receiver has not detected the presence of an 802.11 type of signal. Alternatively, the noise floor may also be estimated during the reception of a packet depending on the capabilities of the receiver. Measurements are performed at intervals on the order of $T_{nf}$, which is relatively short, for example 100 ms or less. These measurements are averaged over a period of time ($T_{UI}$), on the order of a second.

Referring still to FIG. 4, it is then determined whether a noise floor measurement is available during the measurement period (step 420). In step 430, if a noise floor measurement at the AP 105 ($I_{AP}$) exists, $RRP_{UI}$ is determined as follows:

$$RRP_{UI} = I_{AP} + (C/I)_{req\_low} \quad \text{Equation 4}$$

where $I_{AP}$ is the noise floor estimate, and $(C/I)_{req\_low}$ is a configurable parameter representing the typical required carrier-to-interference ratio to have a reasonable probability of success at a low rate, (e.g., 1 or 2 Mbps). If no measurement of noise floor is available during the period, $RRP_{UI}$ is left to the value it was set to at the previous activation, or $RRP_{min}$ if this is the first activation (step 440).

The RRP is obtained by combining the results of the slow interference estimation process 300 and the fast interference estimation process 400, as follows:

$$RRP = \max\{RRP_{DS}, RRP_{UI}\} \quad \text{Equation 5}$$

If Equation 5 is analyzed according to the relationship between $RRP_{DS}$ and $RRP_{UI}$, $RRP_{UI}$ should ideally be set at a level slightly lower than what would be necessary for the desired downlink quality, so that the RRP be primarily obtained by $RRP_{DS}$, except just after a sudden increase of external interference. In this way, the fast interference estimation sub-process avoids that the downlink quality stays low during many minutes after the increase of interference.

After the RRP of the WTRU 110 is obtained, the function generator 135 in the AP 105 sets the transmission power of the AP 105 in order to make the WTRU 110 receive the previously obtained RRP.

In a scenario where the AP 105 sustains a level of interference much higher than the WTRUs 110 at the range, this method of obtaining the RRP would make the AP 105 transmit at a power higher than needed. Alternatively, the RRP may be reset to $RRP_{DS}$ (ignoring $RRP_{UI}$) after a minimum amount of time, e.g., several minutes, during which the $RRP_{UI}$ is constantly above the $RRP_{DS}$. Thereafter, $RRP_{UI}$ would be taken into consideration only upon bad downlink performance.

Although the features and elements of the present invention are described in the preferred embodiments in particular combinations, each feature or element can be used alone without the other features and elements of the preferred embodiments or in various combinations with or without other features and elements of the present invention.

What is claimed is:

1. In a wireless communication system including at least one access point (AP) and at least one wireless transmit/receive unit (WTRU) associated with the AP, a method of determining a minimum transmission power level of the AP, the method comprising:
   (a) estimating an interference to the AP by:
      (a1) executing a slow interference estimation process to estimate an interference during a relatively long period; and
      (a2) executing a fast interference estimation process to estimate an interference during a relatively short period; and
   (b) obtaining a required received power (RRP) of the WTRU based on the interference estimate of step (a).

2. The method of claim 1 wherein step (a1) further comprises:
   (i) analyzing transmitted data when a packet is transmitted to the WTRU;
   (ii) recording the result of the analysis;
   (iii) determining whether there is at least a low quality bin;
   (iv) setting an RRP from downlink statistics ($RRP_{DS}$) to the same value of a previous activation minus some predetermined value, if there is no low quality bin; and
   (v) setting the $RRP_{DS}$ to a received signal strength indicator (RSSI) value corresponding to the first bin above the highest low quality bin, if there is at least one low quality bin.

3. The method of claim 2 wherein the low quality bin is a significant bin having an average data rate of successful transmission which is below a threshold and rate control enabled, or a percentage of successful transmissions is below a threshold.

4. The method of claim 2 wherein step (a1) further comprises:
   (vi) executing the slow interference estimation successively; and
   (vii) recording an average of the result of the analysis cumulatively in the histogram.

5. The method of claim 2 wherein the step (a1)(i) further comprises computing the average data range of successful transmissions and the percentage of successful transmissions perceived by WTRU.

6. The method of claim 2 wherein $RRP_{DS}$ is set as a minimum value of RRP ($RRP_{min}$), if there is no low quality bin and there is no previous activation.

7. The method of claim 1 wherein step (a2) further comprises:
   (i) the AP performing a noise floor measurement based on a received signal strength indicator (RSSI);
   (ii) determining whether the noise floor measurement is available in the absence of carrier lock;
   (iii) setting an RRP from uplink interference ($RRP_{UI}$) to the value of a previous activation, if there is no available noise floor measurement available in the absence of carrier lock; and
   (iv) setting the $RRP_{UI}$ to the following equation, $RRP_{UI} = I_{AP} + (C/I)_{req\_low}$, if the noise floor measurement is available, wherein $I_{AP}$ is an estimate of the noise floor at the AP, and $(C/I)_{req\_low}$ is a configurable parameter representing the typical required carrier-to-interference ratio to have a reasonable probability of success at a low rate.

8. The method of claim 1 further comprising:
   (c) obtaining a range of the AP; and
   (d) determining the minimum transmission power level of the AP by summing the range of the AP obtained in step (c) and the RRP of the WTRU obtained in step (b).

9. The method of claim 1 wherein the wireless communication system is a wireless local area network (WLAN).

10. In a wireless communication system including at least one access point (AP) and at least one wireless transmit/receive unit (WTRU) associated with the AP, a method of determining a minimum transmission power level of the AP, the method comprising:
   (a) obtaining a range of the AP;
   (b) estimating an interference to the AP;
   (c) obtaining a required received power (RRP) of the WTRU based on the interference estimate of step (b); and
   (d) determining the minimum transmission power level of the AP by summing the range of the AP obtained in step (a) and the RRP of the WTRU obtained in step (c).

11. The method of claim 10 wherein step (b) further comprises:

(b1) executing a slow interference estimation process to estimate an interference during a relatively long period; and (b2) executing a fast interference estimation process to estimate an interference during a relatively short period.

12. The method of claim 10 wherein the wireless communication system is a wireless local area network (WLAN).

13. In a wireless communication system including at least one access point (AP) and at least one wireless transmit/receive unit (WTRU) associated with the AP, a method of determining a minimum transmission power level of the AP, the method comprising:

(a) obtaining a range of the AP;

(b) executing a slow interference estimation process to estimate an interference during a relatively long period;

(c) executing a fast interference estimation process to estimate an interference during a relatively short period;

(d) obtaining a required received power (RRP) of the WTRU based on the interference estimates determined by executing the slow interference estimation process and the fast interference estimation process; and (e) determining the minimum transmission power level of the AP by summing the range of the AP obtained in step (a) and the RRP of the WTRU obtained in step (d).

14. The method of claim 13 wherein the wireless communication system is a wireless local area network (WLAN).

15. An access point (AP) for determining a minimum transmission power level, the AP being associated with at least one wireless transmit/receive unit (WTRU), the AP comprising:

(a) means for obtaining a range of the AP;

(b) means for executing a slow interference estimation process to estimate an interference during a relatively long period;

(c) means for executing a fast interference estimation process to estimate an interference during a relatively short period;

(d) means for obtaining a required received power (RRP) of the WTRU based on the interference estimates determined by executing the slow interference estimation process and the fast interference estimation process; and (e) means for determining the minimum transmission power level of the AP by summing the range of the AP and the RRP of the WTRU.

16. An integrated circuit (IC) for determining a minimum transmission power level of an access point (AP), the AP being associated with at least one wireless transmit/receive unit (WTRU), the IC comprising:

(a) means for obtaining a range of the AP;

(b) means for executing a slow interference estimation process to estimate an interference during a relatively long period;

(c) means for executing a fast interference estimation process to estimate an interference during a relatively short period;

(d) means for obtaining a required received power (RRP) of the WTRU based on the interference estimates determined by executing the slow interference estimation process and the fast interference estimation process; and (e) means for determining the minimum transmission power level of the AP by summing the range of the AP and the RRP of the WTRU.

* * * * *

UNITED STATES PATENT AND TRADEMARK OFFICE
CERTIFICATE OF CORRECTION

PATENT NO.       : 7,079,494 B2
APPLICATION NO.  : 10/926892
DATED            : July 18, 2006
INVENTOR(S)      : Marinier et al.

It is certified that error appears in the above-identified patent and that said Letters Patent is hereby corrected as shown below:

At column 4, line 39, after the word "histogram", delete "$H^r$" and insert therefor --$H_r$--.

At column 6, line 53, after the first use of the words "is a", delete "is a".

Signed and Sealed this

Sixth Day of March, 2007

JON W. DUDAS
*Director of the United States Patent and Trademark Office*